Oct. 12, 1971   E. DE WIT   3,611,514
CLOSURE LOCK

Filed Oct. 8, 1969   2 Sheets-Sheet 1

INVENTOR
ERI- DE WIT
BY
ATTORNEYS

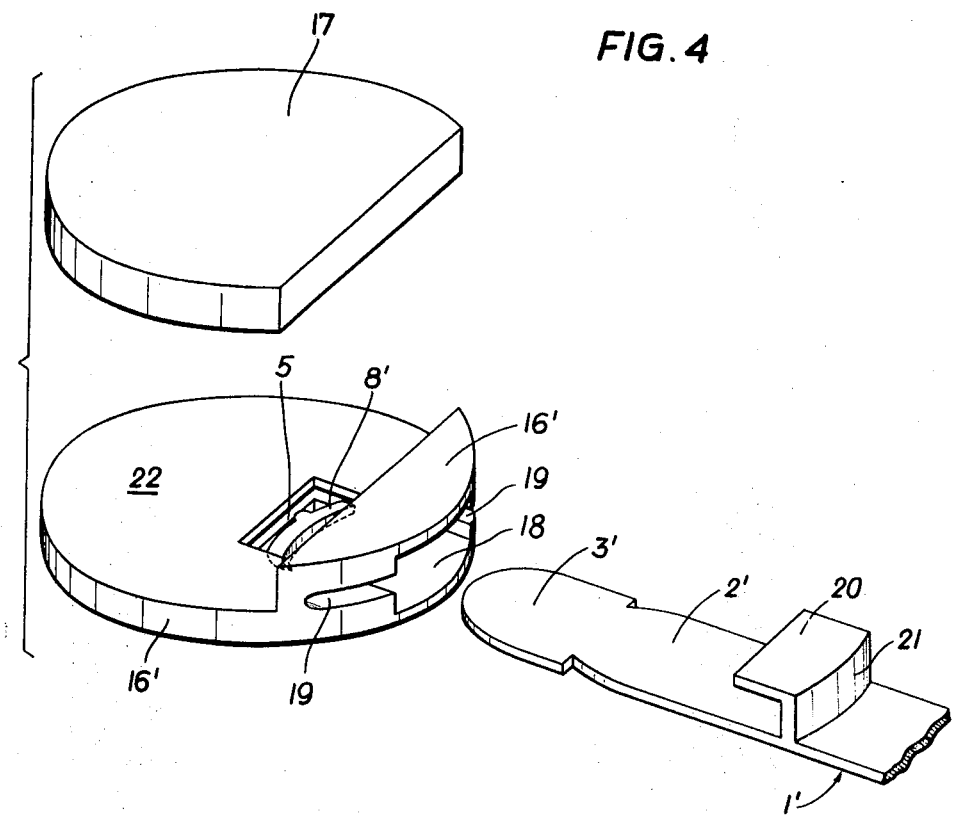

United States Patent Office 3,611,514
Patented Oct. 12, 1971

3,611,514
CLOSURE LOCK
Eric de Wit, 211 Larochegasse, 1130 Vienna, Austria
Filed Oct. 8, 1969, Ser. No. 864,828
Claims priority, application Austria, Oct. 9, 1968,
9,870/68
Int. Cl. A44b 19/00
U.S. Cl. 24—230 SL                                    12 Claims

ABSTRACT OF THE DISCLOSURE

A safety device or locking device for the closure of a package, barrel, carton and the like, including a female member or channel having an opening for receiving a male member or tongue. The male and female members are advantageously made of an inexpensive plastic material and the channel which is formed in the female member includes a locking body which is formed by cutting away an overlying portion of the channel. The locking body includes a curved member which is connected to the channel by a thin web and which is positioned in the channel passageway so as to intercept the tongue which is inserted into the channel. The locking body and the tongue have complementarily curved end faces which interengage during the passage of the tongue through the channel to cause deflection of the locking body into a recess defined at the side of the channel. The tongue includes a recessed side portion at a spaced location from its forward tip and when the locking body moves beyond this recess the end thereof falls into the recess in locking engagement therewith.

SUMMARY OF THE INVENTION

This invention relates in general to the construction of securing devices, and in particular to a new and useful safety device for the closure of a package and which includes a plug member or male part which is insertable into a receiving member or female part each of which may be made of an inexpensive material such as plastic.

The known safety devices of the kind of the present invention which are intended for securing a tied bundle comprises a plastic seal which is detachably connected with the end of a cord and presents a channel which is open at one end. The channel is intended to receive a plug which is fastened to the other end of the cord and which is provided with barbs or projecting elements which engage within and lock in the channel. In the channel, there are a plurality of receiving recesses which permit deflection of the barbs upon insertion of the plug or they receive and interengage with the barbs when movement is effected in a reverse or outward direction. The disadvantage of this known construction is that several parts of elements such as the cord and the locking device or quiver must be embedded into the seal, and this provides a complicated and coarse construction. In addition, the channel member and the plug must be detachably connected to respective ends of the cord so that normally the cord length can only be provided in certain graduations and this requires a stocking in each graduation in order to maintain an adequate supply of cords of various lengths. In addition, the known safety devices are not suitable for securing the closure of widely used "barrels" having a detachable cover. Such closures are secured by means of a pin which is passed through aligned openings of the two closure parts to be secured together and which must be provided with a locking element at the end opposite the head of the pin to prevent it from being pulled out of the aligned openings. Such a device is removable only after it is destroyed.

In accordance with the present invention, there is provided an improved safety device which may be employed in a variety of manners and particularly as closure locks for barrel having detachable covers. In accordnce with the invention, the safety device includes a locking assembly comprising a channel member or female member having a receiving passage or channel which is adapted to receive a plug or male member. The female member is advantageously formed with a locking body which is connected thereto and which is formed as a crescent-shaped member, preferaby attached to the remaining portion of the body through a connecting web or tear element. The locking body is curved, and the curved side is deflected upon insertion of the male member into the female member so that it pivots about its connection to the female member is moved over to one side of the receiving channel defined within the body. At this location, the receiving channel is provided with a recess which permits the plug to pass beyond the locking body until the locking body engages in a recess on a side of the plug and becomes secured between a ledge at the end of the recess of the plug and the female member. The locking body is preferably designed in the form of a crescent or banana shaped element which can be stretched elastically as the plug is inserted. The body is provided on at least one point of its section with a thickness which equals the distance of the plug from the channel wall adjacent the locking body. This permits it to fall into engagement with the process of the plug when the latter is inserted into the female receiving channel.

Accordingly, it is an object of the invention to provide an improved locking or closure device which includes a female receiving member having a channel therein in which is positioned a locking body, the locking body being shaped so as to engage with a male member which is insertable into the channel and be deflected thereby to one side of the channel into a recess provided therein, and wherein the male member is provided with a notch which interengages with the end of the locking body to hold the member member in the channel after it is fully inserted.

A further object of the invention is to provide a closure lock which includes a first portion defining a receiving channel and a second portion defining a tongue or plug which is insertable into the channel, and wherein the receiving portion includes an inexpensive integrally formed locking body which becomes deflected into a notch of the plug when it is inserted into the channel, the part being inexpensively made from material such as plastic and the locking body advantageously being formed by cutting away a portion of the first member to leave a locking body in the form of a web in the channel passage.

A further object of the invention is to provide a device particularly, for securing barrels, bundles and the like which is simple in design, rugged in construction, and economical to manufacture.

The various features of novelty which characterize the invention are pointed out with particularity in the claims annexed to and forming a part of this specification. For a better understanding of this invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 4 is an exploded perspective view of the interengageable parts of another embodiment of the securing device.

GENERAL DESCRIPTION OF THE PREFERRED EMBODIMENTS

Figure 1:
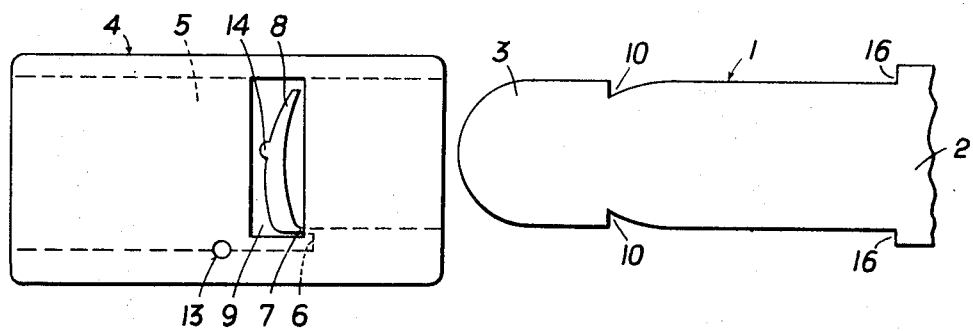
FIG. 1 is a top plan view indicating the two interengageable elements of a safety device or closure constructed in accordance with the invention.
Figure 2:
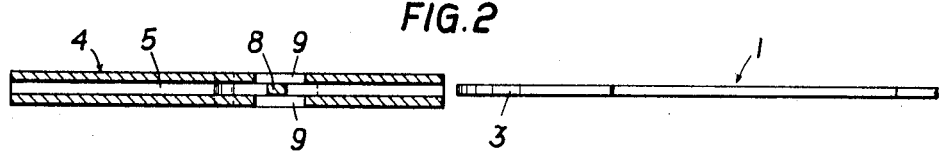
FIG. 2 is a partial longitudinal sectional view and side elevational view of the device indicated in FIG. 1.
Figure 3:
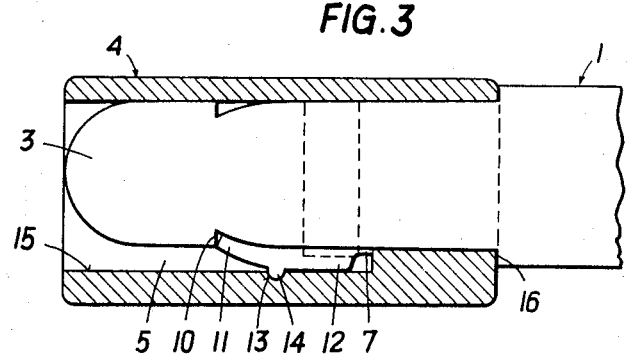
FIG. 3 is a horizontal sectional view of the device indicated in FIG. 1, but with the male member engaged in the female member.

Referring to the drawings in particular, the invention embodied therein in FIGS. 1 through 3, includes a plug or male member 1 which includes a shank portion 2 and a rounded front end 3 which is shaped to facilitate the insertion of the plug into a channel 5 defined on a female member or channel body generally designated 4. The plug or female member are advantageously made of an inexpensive material such as plastic and are formed in a flattened condition as indicated. The channel 5 is provided with a recess upon at least one side which defines a step or ledge 6. During the formation a crescent-shaped or banana-shaped locking body 8 is formed as a connection with the channel member 4 by means of a thin web or tear element 7. A principal feature of the invention is the fact that the parts can be made simply and inexpensively. Therefore, a fundamental advantage of the present invention is the fact that the locking body 8 is advantageously formed as a part of the top wall of the channel member 4 and at the same time the member is formed with apertures 9 by the shaping tool which forms the cavity for the locking body in the production process.

The plug 1 is provided with a recess 10 on each side which are of sawtooth configurations, and into one of these recesses there engages the free end 11 of the locking body 8 after the plug 1 has been inserted into the channel (see FIG. 3). During the insertion of the plug 1 into the channel 5, the rounded front end 3 contacts the rounded side of the locking body 8 in the position indicated in FIG. 1, and it deflects the body by about 90°. In so doing, this may cause the web 7 to break. This, however, in no way impairs the effectiveness of the lock since after application of the sleeve to the plug 1 or vice versa, the locking body 8 takes support by its end 11 on the front flank of the recess 10. The other end 12 of the locking body 8 rests against shoulder 6 of the channel 15.

The action of the lock or safety closure constructed in accordance with the invention is therefore not based on the locking body 8 being elastically connected with the channel member 4, as is the case with most of the previously known safety devices of this type, but it forms a lock due to the fact that it takes support by its ends upon mutually oppositely directed faces of the plug 1 and the channel 4.

In order to prevent introduction of the locking body 8 from the open side, that is, to the left as indicated in FIG. 3, and so as to exclude manipulation of the safety device, the channel member 5 may contain, in the region of the locking body, a notch or recess 13 which provides a receptacle for a projection 14 formed on the locking body 8. With this construction, the total thickness of the locking body 8 is greater than the distance of the shank tip from a side wall 15 of the channel member 5.

To exclude manipulation or opening of the device through the openings 9, the locking body is designed so that in the region of the windows, with the plug inserted, it has a thickness which corresponds to the distance of the shank tip and of the face of the channel wall 15.

The shape of the sawtooth notch 10 is made complementary to the form of the locking body 8 so that the plug 1 and the locking body 8 are in close engaging contact. The amount of insertion of the plug 1 relative to the receiving channel member 4 is limited by shoulders 16 which are defined on the plug shank 2. The safety device described is extremely inexpensive to manufacture and this is of great importance for a quantity item such as a barrel closure safety device.

The safety device of the invention can also be employed for fixing of the plug and seal or lead to the securement of tied bundles, which may take the form of a knotted string. For such an arrangement, the embodiment of FIG. 4 includes a female part or receiving channel member 16 which defines an interior channel 5' similar to the other embodiment and which includes a segmented upper portion 16' so as to define a receiving base 22 for a cover or disk member 17 which forms, with the segment 16', a circular hub face. The disk 17 is firmly connected to the base 22, such as by heat-sealing, gluing or the like. The channel 5' which is formed within the female member 16 is widened at one end to form a pocket 18 which is centrally located and a partial circumferentially extending groove 19 each of which are open to the exterior of the device.

A locking body 8' is formed within the channel 5' in a manner substantially the same as that indicated in the embodiment of FIGS. 1 through 3.

The male member or plug 1' includes a shank portion 2' and a rounded flat-ended portion 3' as in the first embodiment. In addition, with this embodiment an upstanding arcuate portion or end cover 21 is provided for covering the pocket opening 18. A top facia member 20 extends outwardly from the upstanding arcuate portion 21 to provide a guide for facilitating the insertion of the plug 1' into the receiving channel 5.

The embodiment of FIG. 4 is particularly suitable for securing a tie after it has been made. For example, if a cord is employed to secure a container, bag or the like, then the knot of the securing cord is placed into pocket 18 so that the cord sections starting from the knot extend outwardly on each side through the grooves 19. The plug 1 is then introduced and secured in position by the locking body 8' when it penetrates by an amount to position the upstanding arcuate portion 21 so that it closes the opening of the pocket 18.

It should be appreciated that in each of the embodiments illustrated the channel member 5 or 5' may be either manufactured so that it opens at one end or closed as desired.

What is claimed is:

1. A clasp, comprising a female part defining a receiving channel with a first engagement shoulder adjacent a side of said channel, a locking member, hinge means for freely pivoting said locking member on said female part adjacent said channel, said locking member having a portion disposed in said channel, a male part receivable in said channel of said female part and having a front end portion engageable with said locking member as it is received within said female part channel to deflect said locking member to one side of said channel by movement thereof about its pivot, said male part having a side with a second engagement shoulder which when said male part is fully within said female part lies in spaced opposition to said first engagement shoulder, said locking member being deflected about said hinge means by relative movement of said male part and said female part during interengagement into a position to engage between said first and second engagement shoulders and lock said male part against relative movement with respect to said female part.

2. A device as in claim 1, wherein said male part presses said locking member against said female part in the channel near said hinge means during interengagement of said male part and said female part, said locking member being resilient and having a shape such that during interengagement said locking member is resiliently distorted so that one portion thereof is biased against the female part and another portion thereof is biased against the male part, said male part having a recess for receiving said locking member.

3. A device as in claim 2, wherein said female part includes interior abutment means near said hinge means, and the thickness of a portion of said locking member is sufficiently great to occupy substantially all the distance on one side of the channel between said female part and said male part.

4. A safety device as in claim 1, wherein said hinge means holds said locking member transversely across the receiving channel when said locking member is free of exterior forces, said female part forming an opening transverse to said channel along said locking means.

5. A safety device for the closure of a package and the like, comprising a female part defining a receiving channel with a first engagement shoulder adjacent a side of said channel, a locking member pivoted on said female part adjacent said channel and having a portion disposed in said channel, a male part receivable in said channel of said female part and having a front end portion engageable with said locking member as it is received within said female part channel to deflect said locking member to one side of said channel by movement thereof about its pivot, said male part having a side with a second engagement shoulder which when said male part is fully within said female part lies in spaced opposition to said first engagement shoulder, said locking member being deflected by relative movement of said male part and said female part during interengagement into a position to engage between said first and second engagement shoulders and lock said male part against relative movement with respect to said female part, said locking body being crescent-shaped and composed of a material permitting it to be elastically stretched as said female part and said male part are being interengaged.

6. A safety device, according to claim 5 wherein said locking body presents at least one point of its cross-section which extends from its center to its connecting portion to said female part of a thickness which is equal to the distance of said male part from the inner end of said channel.

7. A safety device, according to claim 5 wherein said male part is provided with a head portion and includes a shank adapted to be aligned with apertures of the closure parts of a barrel closure which are to be fixed relatively to each other, said shank being provided with at least one receiving recess defining said second engagement shoulder for said locking member which is of generally sawtooth configuration.

8. A safety device for the closure of a package and the like, comprising a female part defining a receiving channel with a first engagement shoulder adjacent a side of said channel, a locking member pivoted on said female part adjacent said channel and having a portion disposed in said channel, a male part receivable in said channel of said female part and having a front end portion engageable with said locking member as it is received within said female part channel to deflect said locking member to one side of said channel by movement thereof about its pivot, said male part having a side with a second engagement shoulder which when said male part is fully within said female part lies in spaced opposition to said first engagement shoulder, said locking member being deflected by relative movement of said male part and said female part during interengagement into a position to engage between said first and second engagement shoulders and lock said male part against relative movement with respect to said female part, said female part including an enlarged pocket at the outer end of said channel which is adapted to receive a tying knot of a closure cord, said male part having an upstanding cover surface closing said pocket when said male part is interengaged in said female part.

9. A safety device for the closure of a package and the like, comprising a female part defining a receiving channel with a first engagement shoulder adjacent a side of said channel, a locking member pivoted on said female part adjacent said channel and having a portion disposed in said channel, a male part receivable in said channel of said female part and having a front end portion engageable with said locking member as it is received within said female part channel to deflect said locking member to one side of said channel by movement thereof about its pivot, said male part having a side with a second engagement shoulder which when said male part is fully within said female part lies in spaced opposition to said first engagement shoulder, said locking member being deflected by relative movement of said male part and said female part during interengagement into a position to engage between said first and second engagement shoulders and lock said male part against relative movement with respect to said female part, said female part comprising a flat rectangular member having a window cutout at the location defining said locking member, said locking member comprising an arcuate member connected to said female part by a thin web of material and extending across said channel.

10. A safety device, according to claim 9, wherein said male member includes a rounded end engageable with the arcuate end of said locking member, said thin web connecting said locking member to said female part comprising the pivot for said locking member holding said locking member during insertion of said male part to deflect it substantially against the side of said channel adjacent said web.

11. A safety device, according to claim 10, wherein said channel is provided with a recess intermediate its length defining a shoulder adjacent the connection of said locking member to said female part, said locking member being deflectable into said recess during insertion of said male member.

12. A safety device, according to claim 11, including a notch defined along the recess of said channel and a projection defined on said locking member engageable in said notch to hold said locking member against displacement within said channel.

References Cited

UNITED STATES PATENTS

| | | | |
|---|---|---|---|
| 623,701 | 4/1899 | Brisselet | 24—230 SL UX |
| 1,174,306 | 3/1916 | Braaten | 292—322 |
| 3,467,427 | 9/1969 | Moberg | 292—322 |

DONALD A. GRIFFIN, Primary Examiner

U.S. Cl. X.R.

292—322